US010848975B2

(12) United States Patent
Tenny (10) Patent No.: US 10,848,975 B2
(45) Date of Patent: Nov. 24, 2020

(54) SYSTEM AND METHOD OF PROVIDING UE CAPABILITY FOR SUPPORT OF SECURITY PROTECTION ON BEARERS (71) Applicant: Futurewei Technologies, Inc., Plano, TX (US)

(72) Inventor: Nathan Edward Tenny, Portland, OR (US)

(73) Assignee: Futurewei Technologies, Inc., Plano, TX (US)

(*) Notice: Subject to any disclaimer, the term of this patent is extended or adjusted under 35 U.S.C. 154(b) by 180 days.

(21) Appl. No.: 16/009,028

(22) Filed: Jun. 14, 2018

(65) Prior Publication Data

US 2019/0149993 A1 May 16, 2019

Related U.S. Application Data

(60) Provisional application No. 62/586,057, filed on Nov. 14, 2017.

(51) Int. Cl.
*H04W 12/10* (2009.01)
*H04W 76/10* (2018.01)
*H04W 8/22* (2009.01)

(52) U.S. Cl.
CPC ............ *H04W 12/10* (2013.01); *H04W 8/22* (2013.01); *H04W 12/1006* (2019.01); *H04W 76/10* (2018.02)

(58) Field of Classification Search
CPC ............ H04W 12/0013; H04W 12/10; H04W 12/1006; H04W 28/18; H04W 28/20; H04W 28/22; H04W 72/48; H04W 76/10
See application file for complete search history.

(56) References Cited

U.S. PATENT DOCUMENTS

| 6,175,576 B1 * | 1/2001 | Boakye ............... H04M 11/062 370/524 |
| 2002/0044552 A1 * | 4/2002 | Vialen ............... H04W 12/0017 370/389 |

(Continued)

FOREIGN PATENT DOCUMENTS

| CN | 105794243 A | 7/2016 |
| WO | 2013183971 A1 | 12/2013 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14), 3GPP TS 36.300 v14A.0, Sep. 2017, 329 pages.

(Continued)

*Primary Examiner* — Kevin C. Harper
(74) *Attorney, Agent, or Firm* — Slater Matsil, LLP (57) ABSTRACT

A UE indicates its capability for processing integrity-protected data for integrity protection, such as a first data throughput rate, and a gNB receives the capability of the UE for processing integrity-protected data. Processing integrity-protected data may include computing an integrity value for the integrity-protected data. The gNB determines, based on the capability of the UE, whether the UE satisfies a requirement of a second data throughput rate that is associated with a data radio bearer. The second data throughput rate is required for processing data communicated on the data radio bearer for integrity protection. The gNB establishes the data radio bearer with the UE when the capability of the UE satisfies the requirement of the second data throughput rate.

28 Claims, 5 Drawing Sheets

(56) References Cited

U.S. PATENT DOCUMENTS

| | | | |
|---|---|---|---|
| 2016/0029213 A1 | 1/2016 | Rajadurai et al. | |
| 2016/0073265 A1 | 3/2016 | Vutukuri et al. | |
| 2016/0219025 A1 | 7/2016 | Nair et al. | |
| 2016/0302075 A1 | 10/2016 | Dudda et al. | |
| 2017/0238349 A1* | 8/2017 | Uchino | H04W 76/10 |
| | | | 370/329 |
| 2017/0265190 A1* | 9/2017 | Marjelund | H04W 28/22 |
| 2019/0394651 A1* | 12/2019 | Wifvesson | H04W 12/02 |

OTHER PUBLICATIONS

3rd Generation Partnership Project; Technical Specification Group Radio Access Network; Evolved Universal Terrestrial Radio Access (E-UTRA); User Equipment (UE) radio access capabilities (Release 14), 3GPP TS 36.306 v14.4.0, Sep. 2017, 80 pages.

3rd Generation Partnership Project; Technical Specification Group Radio Access Network; NR; NR and NG-RAN overall Description; Stage 2 (Release 15), 3GPP TS 38.300 v1.1.1, Oct. 2017, 60 pages.

3rd Generation Partnership Project; Technical Specification Group Radio Access Network; NR; User Equipment (UE) radio access capabilities (Release 15), 3GPP TS 38.306 v0.0.3, Aug. 2017, 8 pages.

3rd Generation Partnership Project; Technical Specification Group Radio Access Network; NR; Medium Access ontrol (MAC) protocol specification (Release 15); 3GPP TS 38.321 V1.0.0, Sep. 2017, 46 pages.

QUALCOMM Incorporated, et al., "TP for Usage of User Plane Integrity Protection," 3GPP TSG-RAN WG2 Meeting #100, R2-1712468, Nov. 27-Dec. 1, 2017, Reno, USA, 2 pages.

ZTE Corporation, Sanechips, "Data Rate Restrictions for User Plane Integrity Protection," 3GPP TSG-RAN WG2 Meeting #100, R2-1712611, Nov. 27-Dec. 1, 2017, Reno, USA, 3 pages.

\* cited by examiner

SYSTEM AND METHOD OF PROVIDING UE CAPABILITY FOR SUPPORT OF SECURITY PROTECTION ON BEARERS

CROSS-REFERENCE TO RELATED APPLICATIONS

This application claims the benefit of U.S. Provisional Application No. 62/586,057, filed on Nov. 14, 2017 and entitled "System and Method of Providing UE Capability for Support of Security Protection on Bearers", which application is hereby incorporated by reference in its entirety.

TECHNICAL FIELD

The present disclosure relates generally to wireless communications, and in particular embodiments, to techniques and mechanisms for providing UE capability for support of security protection on bearers.

BACKGROUND

Fifth Generation (5G) wireless networks may represent a major paradigm shift from previous wireless networks. For example, 5G wireless networks may provide increased capacity and coverage for better broadband access to Internet or cloud services. 5G wireless networks may utilize high carrier frequencies with unprecedented numbers of antennas. 5G wireless networks may also be highly integrative, tying any potentially new 5G air interface together with LTE and Wi-Fi to provide universal high-rate coverage with a seamless user experience.

SUMMARY

Technical advantages are generally achieved, by embodiments of this disclosure which describe a system and method of providing UE capability for support of security protection on bearers.

According to one aspect of the present disclosure, there is provided a method that includes receiving, by a gNodeB (gNB), information comprising capability of a user equipment (UE) for processing integrity-protected data for integrity protection, the capability comprising a first data throughput rate that indicates a rate at which the integrity-protected data can be processed for integrity protection; receiving, by the gNB, a request for establishing a first data radio bearer with the UE, the first data radio bearer being established for communicating data that has integrity protection, and the first data radio bearer associated with a requirement of a second data throughput rate that is required for processing the data communicated on the first data radio bearer; and determining, by the gNB, that the UE satisfies the requirement of the second data throughput rate based on the capability of the UE and, based thereon, establishing, by the gNB, the first data radio bearer with the UE.

Optionally, in any of the preceding aspects, the first data throughput rate is an amount of data per unit of time that can be processed by the UE for integrity protection.

Optionally, in any of the preceding aspects, the capability of the UE is a maximum capability or a threshold capability that the UE can support for processing the integrity-protected data.

Optionally, in any of the preceding aspects, receiving the information comprising the capability comprises receiving the information comprising the capability for processing the integrity-protected data when the UE attaches to a wireless network.

Optionally, in any of the preceding aspects, the information comprising the capability is received from an access and mobility management function (AMF), another gNB, or the UE.

Optionally, in any of the preceding aspects, determining, by the gNB, whether the UE satisfies the requirement of the second data throughput rate comprises: determining whether the requirement of the second data throughput rate can be satisfied based on the first data throughput rate and the second data throughput rate.

Optionally, in any of the preceding aspects, when the first data throughput rate is greater than or equal to the second data throughput rate, the UE satisfies the requirement of the second data throughput rate.

Optionally, in any of the preceding aspects, determining, by the gNB, whether the UE satisfies the requirement of the second data throughput rate comprises: determining whether the requirement of the second data throughput rate can be satisfied based on the capability of the UE, the second data throughput rate, and a third throughput rate associated with at least one second data radio bearer, the second data radio bearer having been established with the UE and configured to communicate integrity-protected data.

Optionally, in any of the preceding aspects, when the first data throughput rate is greater than or equal to a sum of the second data throughput rate and the third throughput rate, the UE satisfies the requirement of the second data throughput rate.

According to another aspect of the present disclosure, there is provided a method that includes sending, by a user equipment (UE), information comprising capability of the UE for processing integrity-protected data for integrity protection, the capability comprising a first data throughput rate, wherein processing the integrity-protected data comprises computing an integrity value for the integrity-protected data; receiving, by the UE, a message for the UE to establish a first data radio bearer, the first data radio bearer being established for communicating data that has integrity protection, and the first data radio bearer being associated with a requirement of a second data throughput rate that is required for processing the data that has integrity protection, wherein the requirement of the second data throughput rate is satisfied by the UE, and wherein the capability of the UE allows determination of whether the requirement of the second data throughput rate can be satisfied by the UE; and establishing, by the UE in response to the received message, the first data radio bearer.

Optionally, in any of the preceding aspects, the first data throughput rate is an amount of data per unit of time that is to be processed for integrity protection.

Optionally, in any of the preceding aspects, the capability of the UE is a maximum capability or a threshold capability that the UE can support for processing the integrity-protected data.

Optionally, in any of the preceding aspects, the information comprising the capability is sent when the UE attaches to a wireless network.

Optionally, in any of the preceding aspects, when the first data throughput rate is greater than or equal to the second data throughput rate, the UE satisfies the requirement of the second data throughput rate.

Optionally, in any of the preceding aspects, whether the requirement of the second data throughput rate is satisfied by the UE is determined based on the capability of the UE, the second data throughput rate, and a third throughput rate associated with at least a second integrity-protected data radio bearer, the second integrity-protected data radio bearer having been established with the UE.

According to yet another aspect of the present disclosure, there is provided an apparatus that includes a non-transitory memory storage comprising instructions; and one or more processors in communication with the non-transitory memory storage. The one or more processors execute the instructions to: send capability of a user equipment (UE) for processing integrity-protected data for integrity protection, the capability comprising a first data throughput rate, wherein processing the integrity-protected data comprises computing an integrity value for the integrity-protected data; receive a request to establish a first data radio bearer, the first data radio bearer being established for communicating data that are integrity-protected according to an integrity protection technique, and the first data radio bearer being associated with a requirement of a second data throughput rate, wherein the requirement of the second data throughput rate is satisfied by the UE, and wherein the capability of the UE sent by the UE allows a network node to evaluate whether the requirement of the second data throughput rate is satisfied by the UE; and establish, in response to the request, the first data radio bearer.

Optionally, in any of the preceding aspects, the first data throughput rate is an amount of data per unit time that is to be processed for integrity protection.

Optionally, in any of the preceding aspects, the capability of the UE is a maximum capability or a threshold capability that the UE can support for processing the integrity-protected data.

Optionally, in any of the preceding aspects, the capability is sent when the UE attaches to a wireless network.

Optionally, in any of the preceding aspects, when the first data throughput rate is greater than or equal to the second data throughput rate, the UE satisfies the requirement of the second data throughput rate.

Optionally, in any of the preceding aspects, whether the requirement of the second data throughput rate is satisfied by the UE is determined based on the capability of the UE, the second data throughput rate, and a third throughput rate associated with at least a second data radio bearer, the second data radio bearer having been established with the UE and configured to communicate data with integrity protection.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

5G new radio (NR) introduces a requirement for integrity protection on data radio bearers (DRBs). User equipments (UEs) with pre-determined capability for processing integrity-protected data may not be able to accommodate various data throughput rate requirements of integrity-protected bearers. Aspects of this disclosure provide a method for indicating UE's capability for integrity protection. Based on the indicated capability, whether an integrity-protected data radio bearer may be established with the UE may be determined such that the indicated capability of the UE for integrity protection is not exceeded.

In some embodiments, capability of a UE for integrity protection may include capability of the UE for processing integrity-protected data for integrity protection. A UE may compute an integrity value for data to be transmitted, and transmit the integrity value with the data, so that the transmitted data has integrity protection. A UE may also compute an integrity value for data that is received with integrity protection, and determine integrity of the received data based on the integrity value. In one embodiment, capability of a UE for processing integrity-protected data may be represented by a data throughput rate for processing integrity-protected data for integrity protection. A data throughput rate may be an amount of data that is processed for integrity protection per unit time. For example, a data throughput rate may be represented by a transport block (TB) size per slot, or a number of transport layer bits per unit time on integrity-protected channels. A unit time may include a subframe, a transmission time interval (TTI), a slot, a frame, or a NR-unit. A data throughput rate may also be represented by a bit rate of a data radio bearer or a quality of service (QoS) flow.

In some embodiments, a gNB may receive information comprising capability of a UE for processing integrity-protected data for integrity protection, such as a first data throughput rate. The first data throughput rate indicates a rate at which the integrity-protected data can be processed for integrity protection. The gNB may receive a request for establishing an integrity-protected data radio bearer with the UE. The integrity-protected data radio bearer is associated with a requirement of a second data throughput rate that is required for processing data communicated on the integrity-protected data radio bearer. In this case, the gNB may determine whether the UE satisfies the requirement of the second data throughput rate based on the capability of the UE, and establish the integrity-protected data radio bearer with the UE upon determining that the UE satisfies the requirement of the second data throughput rate.

In some embodiments, a UE may send information comprising capability of the UE for processing integrity-protected data for integrity protection, e.g., a first data throughput rate. The UE may then receive a request to establish an integrity-protected data radio bearer associated with a requirement of a second data throughput rate, when the requirement of the second data throughput rate can be satisfied by the UE. The second data throughput rate may be required for processing data communicated on the integrity-protected data radio bearer, and the capability of the UE is used to evaluate whether the requirement of the second data throughput rate may be satisfied by the UE. The UE establishes, in response to the request, the first integrity-protected data radio bearer.

Figure 1:
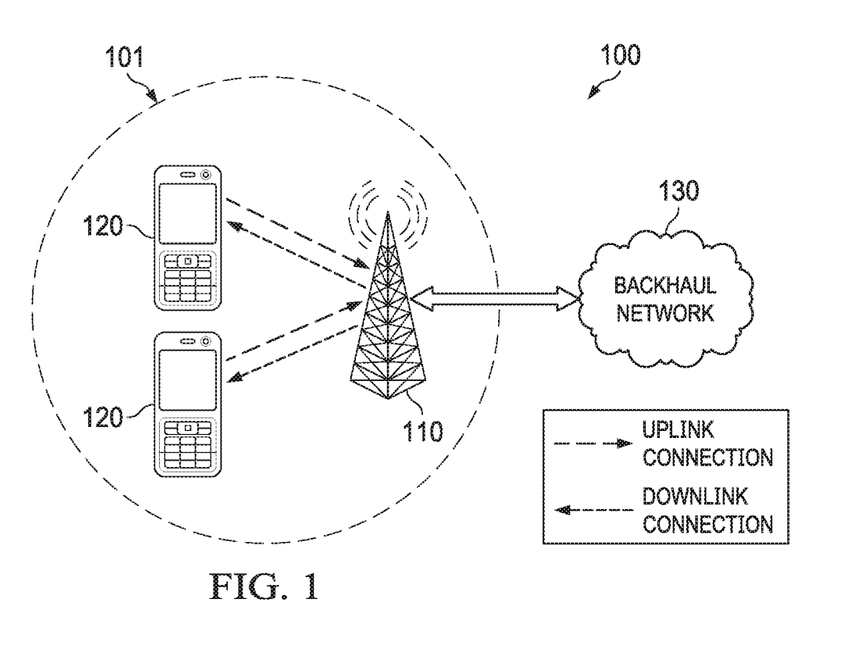
FIG. 1 illustrates a diagram of an embodiment wireless communications network.

FIG. 1 illustrates a network 100 for communicating data. The network 100 comprises a base station no having a coverage area 101, a plurality of mobile devices 120, and a backhaul network 130. As shown, the base station no establishes uplink (dashed line) and/or downlink (dotted line) connections with the mobile devices 120, which serve to carry data from the mobile devices 120 to the base station no and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a gNodeB (gNB), a transmit-receive point (TRP), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

New Radio (NR) is a proposed Fifth Generation (5G) wireless telecommunication standard that is expected to offer unified connectivity for smartphones, cars, utility meters, wearables and other wirelessly enabled devices. NR introduces a requirement for integrity protection on data radio bearers (DRBs). A data radio bearer may be referred to as a radio bearer carrying user-plane data. Throughout this disclosure, the terms of "DRB" and "bearer" are used interchangeably, unless otherwise indicated. Integrity protection on a DRB may include integrity protection of data communicated over the DRB. Integrity protection of data may be generally referred to as a mechanism for protecting data against being modified or altered during communication. According to the requirement for integrity protection, one or more integrity protection mechanisms may be applied to data before transmission such that whether the data has been modified or altered during transmission may be checked or verified, i.e., integrity of data may be determined. In some embodiments, an integrity protection mechanism may be applied to data to be transmitted, and a receiver of the data may process the data to determine integrity of the data according to the integrity protection mechanism. The receiver is configured to have capability of processing the data to determine integrity of the data, e.g., according to the integrity protection mechanism. Data that has such an integrity protection mechanism applied may be referred to as integrity-protected data. A DRB carrying integrity-protected data may be referred to as integrity-protected DRB. Determination of which DRBs are subject to integrity protection may be made by a network node, e.g., a base station.

In some embodiments, integrity-protected data to be communicated over a DRB may include information, e.g., authentication, for a receiver to perform integrity protection. For example, a packet data convergence protocol (PDCP) protocol data unit (PDU) communicated on an integrity-protected bearer may include a message authentication code for integrity (MAC-I), e.g., generated by a cryptographically secure function, that allows a receiver to determine whether the PDCP PDU has been altered (e.g. by an attacker) in transmission. Examples of a MAC-I may include a cryptographically secure checksum, or a cryptographically secure signature. The receiver, e.g., a UE, may be able to confirm that the PDU has not been altered based on the MAC-I. The approach of using a MAC-I to determine integrity of received data has been used in the control plane, and in NR, it can also be applied to the user plane or user data bearers. The approach may be valuable for internet of things (IoT) use cases, where user plane traffic may actually be control information (e.g. industrial control, drones). In some cases, this approach may tend to be used for relatively low data rate applications. In some cases, one or more integrity-protected DRBs may coexist with non-integrity-protected DRBs (i.e., DRBs on which data is communicated without using integrity protection mechanisms) for a single UE. For example, low data rate bearers for a UE may be configured with integrity protection, while high data rate bearers may be configured without integrity protection.

In some embodiments, an integrity protection mechanism may be implemented in hardware, e.g., as part of a UE chipset. For example, an integrity protection engine may be provided in a UE for determining integrity of data received by the UE. In this case, implementing the integrity protection mechanism according to the NR requirement may affect hardware design, e.g., chipset design. Taking the UE chipset as an example, the chipset may need to be dimensioned with capability of integrity protection at the time of design. The capability of integrity protection may be processing capability of the chipset to process integrity-protected data, such as an amount of integrity-protected data processed per time unit. The capability of integrity protection to be provided by the chipset may be determined taking into consideration of various factors, such as typical use cases of the UE for data integrity protection, or the maximum throughput that is required for processing integrity-protected data, etc. When typical use cases of a UE involve processing integrity-protected user plane data on low data rate bearers, the chipset may be dimensioned with integrity protection capability generally targeting at low data rate bearers. For example, the integrity protection capability built into the chipset may have a limited data throughput rate. In this case, when the UE establishes a connection on a high data rate bearer that requires integrity protection, the UE may not be able to provide adequate performance to process integrity-protected data on the high data rate bearer. In NR, user plane bearers may involve extremely high data rate communication of integrity-protected data, which consequently requires extensive processing of the integrity-protected data. The chipset may also be designed to provide capability for processing integrity-protected data of a high (or extremely high) data rate. However, if the typical use cases of the chipset for integrity-protected user data still involve low data rate bearers, the UE's capability may not be utilized to its full capacity. Thus, the chipset may be over-dimensioned, at the cost of, e.g., device sizes, cost, and heat generation.

5G networks may involve diverse traffic types of different data rates requiring integrity protection. UEs having pre-designed (or pre-determined) capability for processing integrity-protected data may not be able to adequately support an integrity protection requirement of each traffic type. When a UE does not have adequate integrity protection capability, data integrity may not be protected, and user experience may also be degraded, e.g., when data integrity is lost but not detected, or when processing of data is delayed due to a limited capability for integrity protection.

In some embodiments, a UE may indicate its capability for integrity protection, and whether an integrity-protected data radio bearer may be established with the UE may be determined based on the indicated capability so that capability of the UE for integrity protection may not be exceeded. Capability of a UE for integrity protection may be referred to as capability for processing integrity-protected data for integrity protection (or processing data for integrity protection). Processing integrity-protected data may include determining integrity of the data according to an integrity protection mechanism. For example, processing the integrity-protected data may include determining whether the data has been altered using a cryptographically secure signature or checksum that is communicated with the data. Processing integrity-protected data may also include transmitting and/or receiving the integrity-protected data, such as applying integrity protection to data to be transmitted according to an integrity protection mechanism. During processing of the integrity-protected data, an integrity value, such as n MAC-I, may be computed. A UE may compute an integrity value for data to be transmitted, and transmit the integrity value with the data, so that the transmitted data has integrity protection. A UE may also compute an integrity value for data that is received with integrity protection, and determine integrity of the received data based on the integrity value.

Capability for processing integrity-protected data may be represented by a data throughput rate for integrity protection (or for processing integrity-protected data). The data throughput rate indicates a rate at which the integrity-protected data can be processed for integrity protection. A data throughput rate may be an amount of data that is processed for integrity protection per unit time. For example, a data throughput rate may be represented by a maximum transport block (TB) size per slot on integrity-protected channels or bearers. Using TB size as a metric to represent the integrity protection capability may be natural because the TB structure is directly related to UE's processing of the data. In another example, a data throughput rate may be represented by a number of transport layer bits per unit time on integrity protected channels. In yet another example, a data throughput rate may be represented by a data rate of one or more data radio bearers or quality of service (QoS) flows measured, e.g., in kilobytes per second (kBps) or kilobits per second (kbps). A data rate may be total bits of integrity-protected data per unit time. For example, a data rate may be represented by total bits of TBs on integrity-protected bearers per subframe. A data throughput rate may also be represented using other metrics or forms, such as a bit rate offered to a bearer, or represented based on QoS measures. Those of ordinary skill in the art would recognize many other ways to indicate and represent the data throughput rate for integrity protection or the capability for processing integrity-protected data.

A unit time may be any time duration that is used as a unit for transmitting data. Examples of a unit time may include a subframe, a transmission time interval (TTI), a slot, a frame, or an NR-UNIT as specified in TS 38.321, "NR: Medium Access Control (MAC) protocol specification (version 1.0.0, 2017 Sep. 4). The indicated capability for processing integrity-protected data may be the maximum capability that the UE can provide. The indicated capability for processing integrity-protected data may also be a threshold capability that is allowed by the UE.

A UE may indicate its capability for processing integrity-protected data by signaling to a network. In one example, indication of the UE's capability for processing integrity-protected data may include a data throughput rate for processing integrity-protected data. For example, a UE may indicate an actual data throughput rate as its capability for integrity protection. Indication of a UE's capability for processing integrity-protected data may include any control information or signal that directly or indirectly references a data throughput rate of the UE for processing integrity-protected data. In one example, a UE may signal its capability for processing integrity-protected data when the UE attaches to a network. In another example, the UE may signal its capability for processing integrity-protected data when receiving a request from a network. The UE may signal its capability for processing integrity-protected data as part of its capability signaling, e.g., UE radio access capability. The capability for processing integrity-protected data may be transmitted in a radio resource control (RRC) signaling.

The capability of a UE for processing integrity-protected data signaled to a network by the UE may be stored in the network, e.g., stored in an access and mobility management function (AMF). A base station, e.g., a gNB, may receive the capability of the UE for processing integrity-protected data, and schedule an integrity-protected DRB for the UE based on the received capability of the UE, without exceeding the UE's capability for performing integrity protection processing. In one example, the gNB may receive the capability of the UE for processing integrity-protected data from a network element, e.g., an AMF, when being requested for establishing an integrity-protected radio bearer with the UE. In another example, the gNB may receive the capability of the UE for processing integrity-protected data, e.g., from another gNB, when the UE is being handed over to the gNB. In yet another example, the gNB may also request the capability of the UE for processing integrity-protected data from the UE.

Figure 2:
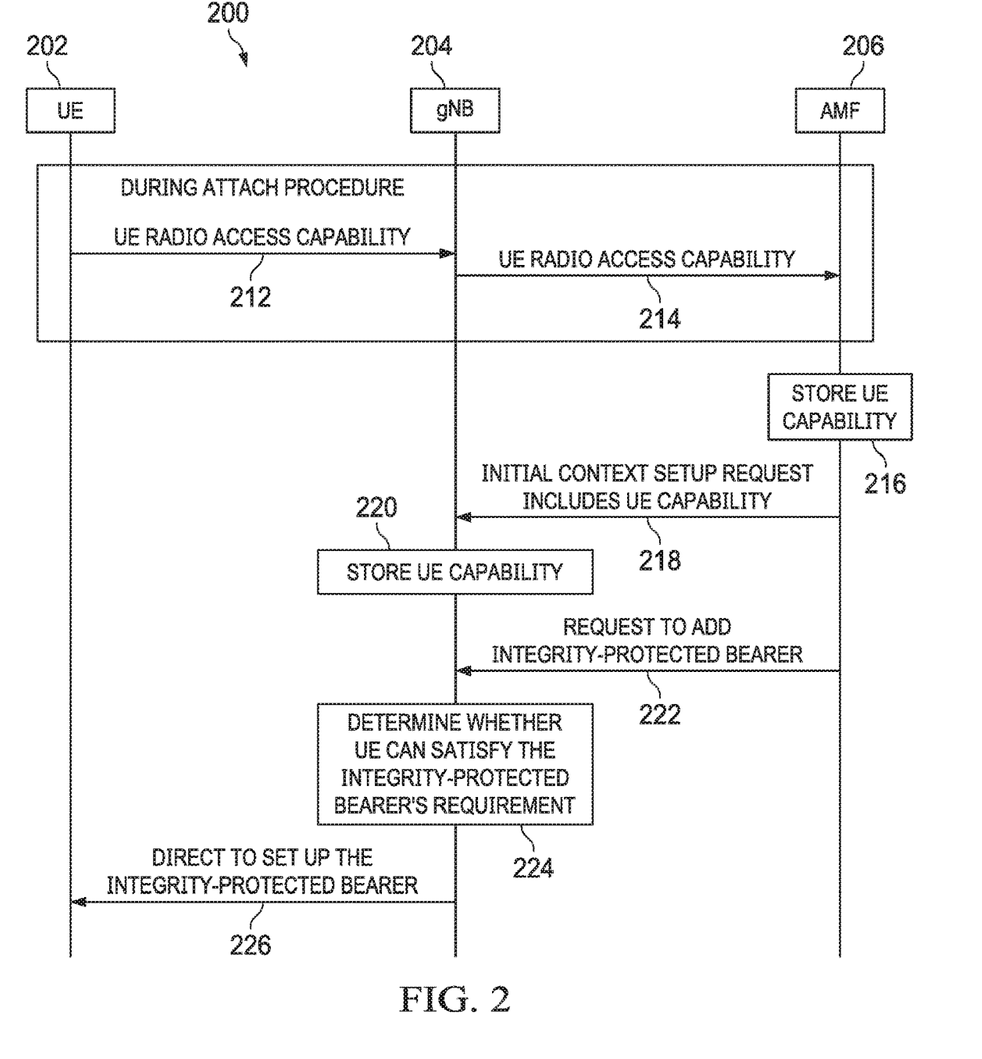
FIG. 2 illustrates a sequence diagram of an embodiment wireless communications method.

FIG. 2 illustrates a sequence diagram of an embodiment method 200 for wireless communications. In this example, a gNB sets up an integrity-protected bearer with a UE based on the UE's capability for integrity protection. As shown, at step 212, a UE 202 transmits UE radio access capability to a gNB 204 during an attach procedure of the UE to a wireless network. In this example, the UE radio access capability includes capability of the UE 202 for processing integrity-protected data. That is, the UE 202 indicates its capability for processing integrity-protected data as a part of the UE radio access capability. At step 214, the gNB 204 transmits the received UE radio access capability including the capability of the UE for processing integrity-protected data to an AMF 206 during the attach procedure. The AMF 206 may store the UE's capability of processing integrity-protected data at step 216. Step 216 may also be performed during the attach procedure. Delivery and storage of the UE's capability may be in line with legacy procedures. At step 218, the AMF 206 sends an initial context setup request to the gNB 204, including the UE's capability of processing integrity-protected data. The gNB 204 may then store the UE's capability of processing integrity-protected data at step 220. At step 222, the gNB 204 receives a message, a command, or a request, from the AMF 206 to add an integrity-protected bearer for the UE 202. At step 224, the gNB 204 determines whether the UE can satisfy a requirement of the requested integrity-protected bearer for processing integrity-protected data on the integrity-protected bearer based on the UE's capability stored in the gNB 204. At step 226, the gNB 204 may direct the UE 202 to set up the integrity-protected bearer for communication on the integrity-protected bearer. Step 226 may be performed when the gNB 204 determines that the UE's capability satisfies the requirement of the requested integrity-protected bearer. In this case, the UE 202 may receive a request or a command from the gNB 204 for establishing the integrity-protected bearer, and then establish with the gNB 204 the integrity-protected bearer. When the gNB 204 determines that the UE's capability does not satisfy the requirement of the requested integrity-protected bearer, the gNB 204 may not request the UE 202 to establish the integrity-protected bearer.

FIG. 2 illustrates that the gNB 204, through which the UE 202 initially attaches to the wireless network, may receive the integrity protection capability of the UE 202 in an initial context setup request from the AMF 206. In some embodiments, the AMF 206 may also send, to another gNB that is different than the gNB 204, the integrity protection capability of the UE 202 in another initial context setup request. This may be the case when an initial context setup is requested from the another gNB. In some embodiments, the AMF 206 may not send the integrity protection capability of the UE 202 to the gNB 204, although gNB 204 passes the integrity protection capability of the UE 202 to the AMF 206. This may be the case when an initial context setup is not requested from the gNB 204. The AMF 206, when having obtained and/or stored integrity protection capability information of a UE, may transmit the UE's integrity protection capability information to any gNB that may need the information for establishing an integrity-protected bearer with the UE. For example, the AMF 206 may send the integrity protection capability information of the UE to any gNB from which an initial context setup is requested for the UE.

In some embodiments, when the capability of the UE 202 for processing integrity-protected data includes a first data throughput rate, and the integrity-protected bearer to be added requires a second data throughput rate, the gNB 204 may determine whether the UE 202 satisfies the requirement of the second data throughput rate based on the first data throughput rate, the second data throughput rate, and as well as whether the UE 202 has been in communication with the network on any other established integrity-protected bearers (or has been configured with any other integrity-protected bearers) when the integrity-protected bearer is requested. When the UE has not been configured with any other integrity-protected bearers, the gNB may compare the first data throughput rate and the second data throughput rate. In one example, when the first data throughput rate is greater than or equal to the second data throughput rate, the UE may be determined to satisfy the requirement of the second data throughput rate. That is to say, the UE has adequate capability to process integrity-protected data on the requested integrity-protected bearer. Otherwise, when the first data throughput rate is less than the second data throughput rate, the gNB 204 may not schedule the integrity-protected bearer for the UE 202.

In the embodiments of this disclosure, by use of the capability of a UE for processing integrity-protected data, a gNB may determine whether or not a data radio bearer may be established with the UE for communicating integrity-protected data. When the UE's capability does not satisfy the requirement of the data radio bearer, the gNB may not establish the data radio bearer with the UE. This helps avoid establishing an integrity-protected data radio bearer with a UE that has an inadequate integrity protection capability. This also helps avoid a degraded user experience occurred at the UE that is caused by the inadequate capability of the UE for processing integrity-protected data.

In some embodiments, the UE 202 may have been configured with one or more integrity-protected bearers when the integrity-protected bearer is requested. For example, the UE 202 may have been configured with n integrity-protected bearers b1, b2, . . . , bn, each of which is associated with a requirement of a data throughput rate, i.e., r1, r2, . . . , rn, respectively. Each of the n integrity-protected bearers requires a data throughput rate for processing integrity-protected data. In this case, the gNB 204 may determine whether the UE 202 satisfies the requirement of the requested integrity-protected bearer based on the capability of the UE 202 (i.e., the first data throughput rate), the requirement of the requested integrity-protected bearer (i.e., the second data throughput rate), and the n integrity-protected bearers that the UE 202 has been configured with (i.e., data throughput rates r1, r2, . . . , rn). In one embodiment, the gNB 204 may evaluate whether the first data throughput rate of the UE can satisfy an aggregated data throughput rate required by the requested integrity-protected bearer and the n integrity-protected bearers that the UE 202 has been configured with. For example, the gNB 204 may evaluate whether the first data throughput rate is greater than a sum of the second data throughput rate and the throughput rates r1, r2, . . . , rn. The gNB 204 may obtain or have had information about the current status of bearers with which the UE has been configured. Status of a bearer may include whether integrity protection is required for data communicated on the bearer and a data throughput rate required by the bearer for integrity protection. When a new integrity-protected bearer is requested by a network, the gNB 204 may be responsible for determining whether adding the new integrity-protected bearer comports with the UE's capability for integrity protection.

Figure 3:
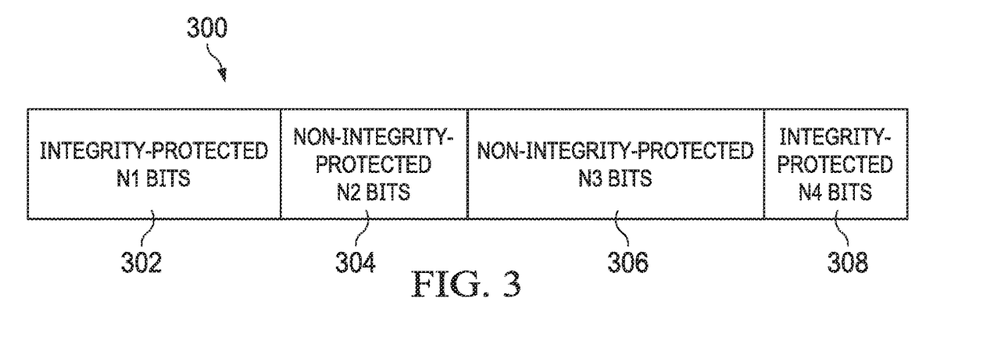
FIG. 3 illustrates a diagram of a transport block (TB) on a media access control (MAC) layer.

In some embodiments, bits of data on integrity-protected bearers may be multiplexed on a MAC layer with bits of data on non-integrity-protected bearers in the same transmission. FIG. 3 illustrates a diagram of a TB 300 on a MAC layer (i.e., a MAC PDU). The TB 300, as shown, includes four MAC service data units (SDUs) 302, 304, 306, 308. MAC SDUs 302, 308 include, respectively, N1 and N4 integrity-protected bits. MAC SDUs 304, 306 include, respectively, N2 and N3 non-integrity-protected bits. In some embodiments, bits of non-integrity-protected bearers should not have an impact on processing of bits from integrity-protected bearers. In this example, sending the TB 300 may have an impact of N1+N4 bits on the integrity-protected bearers. When the N1+N4 bits plus any other integrity-protected bits from other MAC PDUs that will be communicated simultaneously with the MAC PDU do not exceed the UE's capability for processing data on integrity-protected bearers, the TB 300 may be constructed and communicated.

A network entity, e.g., a gNB, may be responsible for evaluating whether the UE's capability for processing data on integrity-protected bearers may be exceeded. In some embodiments, the network entity may be configured such that it does not schedule too many bits of integrity-protected data at once for a UE in downlink communications. For example, a gNB may need to ensure that, when all transport blocks for a period of time or unit time (e.g., a subframe, a slot, a TTI, or a NR-UNIT) are built, the number of bits for integrity-protected bearers does not exceed a UE's capability for processing integrity-protected data. In some embodiments, in uplink communications, integrity protection may be a function of the PDCP layer, meaning that during uplink data processing, integrity protection takes place before integrity-protected data are processed by the MAC layer. Thus by the time of scheduling, integrity protection has already been applied. In this case, a network may have the burden to avoid scheduling a UE with a total bit rate of uplink data requiring integrity protection exceeding the UE's integrity protection capability.

A UE may indicate its capability for integrity protection for both uplink and downlink transmissions. A UE may also indicate its capability for integrity protection for uplink transmissions and downlink transmissions separately. For example, a UE may indicate that its capability for processing integrity-protected data is X bits per unit time in uplink, and Y bits per unit time in downlink. In this case, a gNB may determine whether a new integrity-protected bearer may be established with the UE for uplink transmission based on the UE's uplink capability of integrity protection, and for downlink transmission based on the UE's downlink capability of integrity protection.

In case of NR-NR dual connectivity, where two MAC entities serve the same UE, the two MAC entities may schedule the same UE simultaneously. The two MAC entities may be located at the same gNB or different gNBs. For example, the two MAC entities may be located at a master gNB (MgNB) and a secondary gNB (SgNB), respectively. The two MAC entities may generate downlink TBs independently of one another, but the data have to be processed by a single UE. When the two MAC entities (e.g., a first MAC entity and a second MAC entity) schedule integrity-protected data transmissions for a UE simultaneously on two integrity-protected bearers, respectively, each may need to independently determine whether the UE may satisfy the requirement of a data throughput rate required by its corresponding integrity-protected bearer. In this case, whether the UE is able to support the integrity protection requirements of both the two MAC entities may be determined based on not only the UE's own capability for integrity protection, but also data throughput rates required by both the integrity-protected bearers corresponding to the two MAC entities. However, when one of the MAC entities, e.g., the first MAC entity, does not know the data throughput rate requirement of the other, e.g., the second MAC entity, the first MAC entity may not make a correct or appropriate determination to ensure that the UE's capability for integrity protection is not exceeded.

In some embodiments, when a UE is involved in NR-NR dual connectivity served by two MAC entities, the UE's capability for integrity protection may be split between the two MAC entities scheduling bearers for the UE. In this case, each MAC entity may be allocated a fraction of the UE's capability for integrity protection. A MAC entity may determine whether the UE satisfies a required data throughput rate of an integrity-protected bearer based on a fraction of the UE's capability for integrity protection that is allocated to it. In some embodiments, a UE's capability for integrity protection may be evenly split between two MAC entities. For example, when a UE's capability for integrity protection is X bits per unit time, each of two MAC entities corresponding to an MgNB and a SgNB may be allowed to use X/2 bits per unit time as the UE's capability for integrity protection to determine whether an integrity-protected bearer may be established with the UE. In some embodiments, a UE's capability for integrity protection may be split between the two MAC entities in proportion to data throughput rates associated with integrity-protected radio bearers to be established by the two MAC entities with the UE. For example, an MgNB is carrying 100 kbps of integrity-protected data and a SgNB is carrying 300 kbps of integrity-protected data. A UE's integrity protection capability is X bits per unit time. In this case, fractions of the UE's integrity protection capability, i.e., X/4 bits per unit time and 3X/4 bits per unit time, may be allocated to the MgNB and the SgNB, respectively. The fractions of the UE's integrity protection capability allocated to the MgNB and the SgNB are in proportion to the bearer data rates of the MgNB and the SgNB.

In some embodiments, a UE's capability for integrity protection may be split among a plurality of MAC entities or gNBs scheduling bearers for the UE. Split of a UE's capability for integrity protection among MAC entities or gNBs may be determined by a core network. A core network may have the knowledge about configurations (such as a data throughput rate or a data rate requirement) of bearers associated with the MAC entities or gNBs, and it may accordingly allocate a UE's capability for integrity-protected data among the MAC entities or gNBs according to an allocation rule, e.g., allocating evenly or proportionally, and/or based on the current bearer configurations. A core network may indicate to each gNB a fraction of a UE's capability for integrity protection allocated to the gNB.

Figure 4:
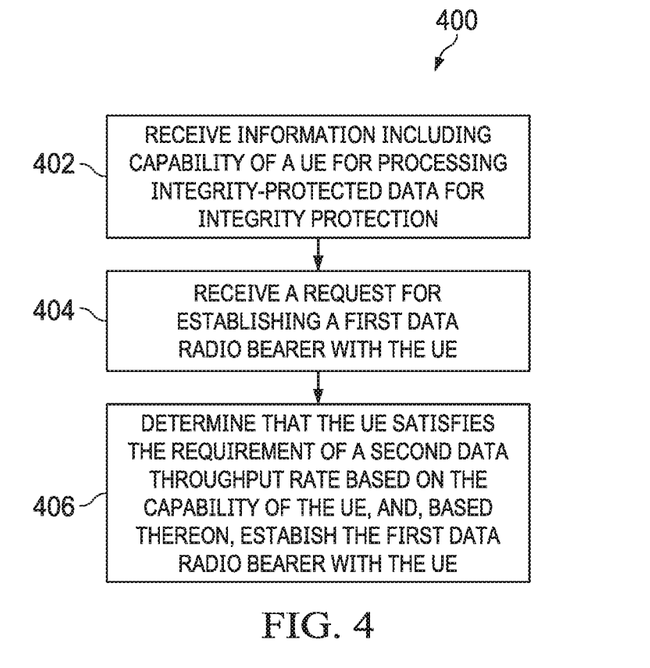
FIG. 4 illustrates a flowchart of an embodiment wireless communications method.

FIG. 4 illustrates a flowchart of an embodiment method 400 for wireless communications. The method 400 may be performed by a gNB, or a communications controller. As shown, at step 402, the method 400 receives information including capability of a UE for processing integrity-protected data for integrity protection. The capability includes a first data throughput rate that indicates a rate at which the integrity-protected data can be processed for integrity protection. Processing the integrity-protected data by the UE may include computing an integrity value for the integrity-protected data. At step 404, the method 400 receives a request for establishing a first data radio bearer with the UE. The first data radio bearer may be established to communicate data that has integrity protection. The first data radio bearer may be associated with a requirement of a second data throughput rate that is required for processing the data communicated on the first data radio bearer. At step 406, the method 400 determines that the UE satisfies the requirement of the second data throughput rate based on the capability of the UE and, based thereon, establishes the first data radio bearer with the UE.

Figure 5:
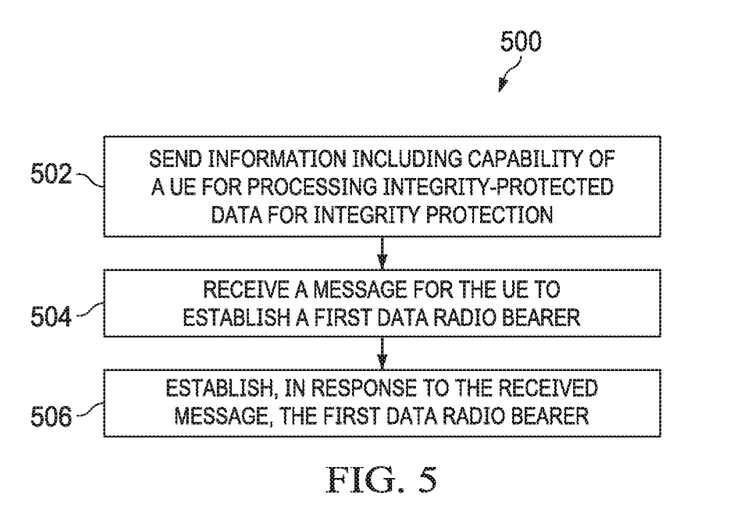
FIG. 5 illustrates a flowchart of another embodiment wireless communications method.

FIG. 5 illustrates a flowchart of an embodiment method 500 for wireless communications. The method 500 may be performed by a UE. As shown, at step 502, the method 500 sends information including capability of the UE for processing integrity-protected data for integrity protection. The capability includes a first data throughput rate. Processing the integrity-protected data by the UE may include computing an integrity value for the integrity-protected data. At step 504, the method 500 receives a message for the UE to establish a first data radio bearer. The first data radio bearer is established for communicating data that has integrity protection, and the first data radio bearer is associated with a requirement of a second data throughput rate that is required for processing the data that has integrity protection. The requirement of the second data throughput rate is satisfied by the UE. The capability of the UE allows determination of whether the requirement of the second data throughput rate can be satisfied by the UE. At step 506, the method 500 establishes, in response to the received message, the first data radio bearer.

Figure 6:
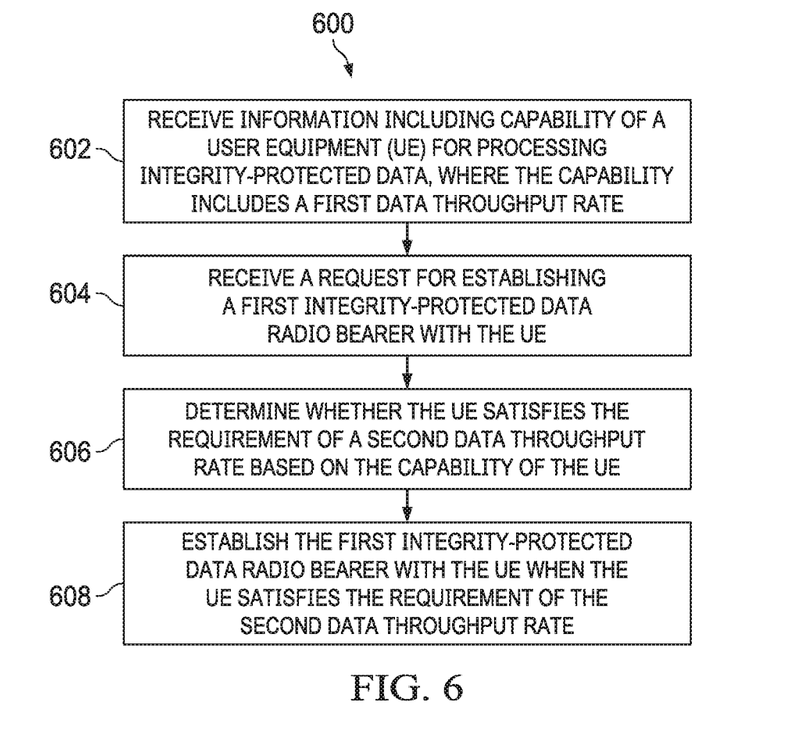
FIG. 6 illustrates a flowchart of yet another embodiment wireless communications method.

FIG. 6 illustrates a flowchart of an embodiment method 600 for wireless communications. The method 600 may be indicative of operations of a network node, e.g., a gNB. At step 602, the method 600 receives information including capability of a user equipment (UE) for processing integrity-protected data, where the capability includes a first data throughput rate. At step 604, the method 600 receives a request for establishing a first integrity-protected data radio bearer with the UE. The first integrity-protected data radio bearer is associated with a requirement of a second data throughput rate that is required for processing data communicated on the first integrity-protected data radio bearer. At step 606, the method 600 determines whether the UE satisfies the requirement of the second data throughput rate based on the capability of the UE. At step 608, the method 600 establishes the first integrity-protected data radio bearer with the UE when the UE satisfies the requirement of the second data throughput rate.

Figure 7:
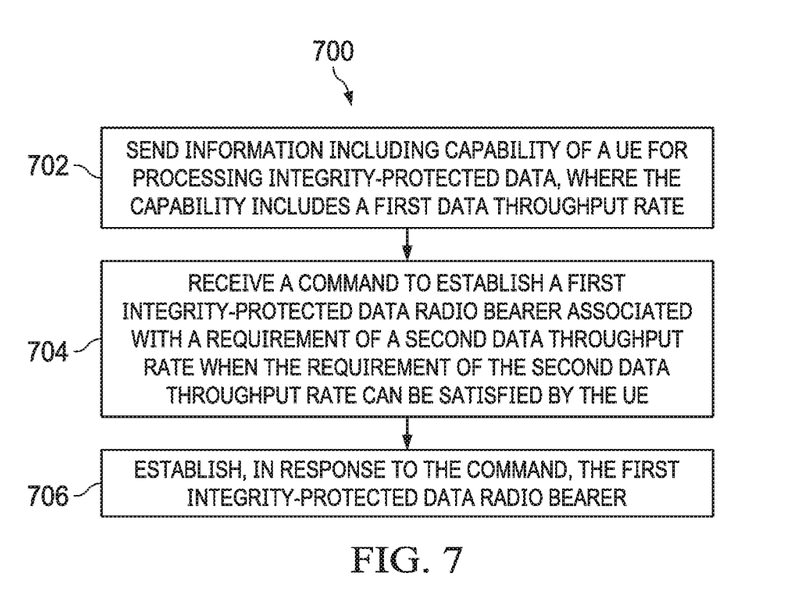
FIG. 7 illustrates a flowchart of yet another embodiment wireless communications method.

FIG. 7 illustrates a flowchart of another embodiment method 700 for wireless communications. The method 700 may be indicative of operations of a UE. At step 702, the method 700 sends information including capability of a UE for processing integrity-protected data, where the capability includes a first data throughput rate. At step 704, the method 700 receives a command to establish a first integrity-protected data radio bearer associated with a requirement of a second data throughput rate when the requirement of the second data throughput rate can be satisfied by the UE. The requirement of the second data throughput rate is required for processing data communicated on the first integrity-protected data radio bearer, and the capability of the UE is used to evaluate whether the requirement of the second data throughput rate can be satisfied by the UE. At step 706, the method 700 establishes, in response to the command, the first integrity-protected data radio bearer.

According to one aspect of the present disclosure, there is provided a method that includes receiving, by a gNodeB (gNB), information comprising capability of a user equipment (UE) for processing integrity-protected data, the capability comprising a first data throughput rate; receiving, by the gNB, a request for establishing a first integrity-protected data radio bearer with the UE, the first integrity-protected data radio bearer associated with a requirement of a second data throughput rate that is required for processing data communicated on the first integrity-protected data radio bearer; determining, by the gNB, whether the UE satisfies the requirement of the second data throughput rate based on the capability of the UE; and establishing, by the gNB, the first integrity-protected data radio bearer with the UE when the UE satisfies the requirement of the second data throughput rate.

Optionally, in any of the preceding aspects, the first data throughput rate is an amount of data per unit of time that can be processed by the UE for integrity protection.

Optionally, in any of the preceding aspects, the first data throughput rate is a number of transport layer bits per unit of time on integrity-protected channels.

Optionally, in any of the preceding aspects, the capability of the UE is the maximum capability or a threshold capability that the UE can support for processing the integrity-protected data.

Optionally, in any of the preceding aspects, receiving the information comprising the capability comprises receiving the information comprising the capability for processing the integrity-protected data when the UE attaches to a wireless network.

Optionally, in any of the preceding aspects, the information comprising the capability is received from an access and mobility management function (AMF), another gNB, or the UE.

Optionally, in any of the preceding aspects, the request for establishing the first integrity-protected data radio bearer with the UE is received from an access and mobility management function (AMF).

Optionally, in any of the preceding aspects, determining, by the gNB, whether the UE satisfies the requirement of the second data throughput rate includes determining whether the requirement of the second data throughput rate can be satisfied based on the first data throughput rate and the second data throughput rate.

Optionally, in any of the preceding aspects, when the first data throughput rate is greater than or equal to the second data throughput rate, the UE satisfies the requirement of the second data throughput rate.

Optionally, in any of the preceding aspects, determining, by the gNB, whether the UE satisfies the requirement of the second data throughput rate includes determining whether the requirement of the second data throughput rate can be satisfied based on the capability of the UE, the second data throughput rate, and a third throughput rate associated with at least one second integrity-protected data radio bearer, the second integrity-protected data radio bearer having been established with the UE.

Optionally, in any of the preceding aspects, when the first data throughput rate is greater than or equal to a sum of the second data throughput rate and the third throughput rate, the UE satisfies the requirement of the second data throughput rate.

Optionally, in any of the preceding aspects, the method further includes receiving, by the gNB, an indication that the capability of the UE is split among a plurality of media access control (MAC) entities, wherein whether the requirement of the second data throughput rate can be satisfied is determined based on a fraction of the capability of the UE.

Optionally, in any of the preceding aspects, the capability of the UE is evenly split among the plurality of MAC entities.

Optionally, in any of the preceding aspects, the capability of the UE is split among the plurality of MAC entities in proportion to data throughput rates associated with integrity-protected radio bearers supported by the plurality of MAC entities.

According to another aspect of the present disclosure, there is provided a method that includes sending, by a user equipment (UE), information comprising capability of the UE for processing integrity-protected data, the capability comprising a first data throughput rate; receiving, by the UE, a command to establish a first integrity-protected data radio bearer associated with a requirement of a second data throughput rate when the requirement of the second data throughput rate can be satisfied by the UE, the requirement of the second data throughput rate being required for processing data communicated on the first integrity-protected data radio bearer, wherein the capability of the UE is used to evaluate whether the requirement of the second data throughput rate can be satisfied by the UE; and establishing, by the UE in response to the request, the first integrity-protected data radio bearer.

Optionally, in any of the preceding aspects, the first data throughput rate is an amount of data per unit of time that is to be processed for integrity protection.

Optionally, in any of the preceding aspects, the first data throughput rate is a number of transport layer bits per unit of time on integrity-protected channels.

Optionally, in any of the preceding aspects, the capability of the UE is the maximum capability or a threshold capability that the UE can support for processing the integrity-protected data.

Optionally, in any of the preceding aspects, the information comprising the capability is sent when the UE attaches to a wireless network.

Optionally, in any of the preceding aspects, when the first data throughput rate is greater than or equal to the second data throughput rate, the UE satisfies the requirement of the second data throughput rate.

Optionally, in any of the preceding aspects, whether the requirement of the second data throughput rate can be satisfied by the UE is determined based on the capability of the UE, the second data throughput rate, and a third throughput rate associated with at least a second integrity-protected data radio bearer, the second integrity-protected data radio bearer having been established with the UE.

Optionally, in any of the preceding aspects, whether the requirement of the second data throughput rate can be satisfied by the UE is determined based on a fraction of the capability of the UE.

According to yet another aspect of the present disclosure, there is provided an apparatus that includes a non-transitory memory storage comprising instructions; and one or more processors in communication with the memory storage, wherein the one or more processors execute the instructions to: receive information comprising capability of a user equipment (UE) for processing integrity-protected data, the capability comprising a first data throughput rate; receive a command for establishing a first integrity-protected data radio bearer with the UE, the first integrity-protected data radio bearer associated with a requirement of a second data throughput rate that is required for processing data communicated on the first integrity-protected data radio bearer; determine whether the UE satisfies the requirement of the second data throughput rate based on the capability of the UE; and establish the first integrity-protected data radio bearer with the UE when the UE satisfies the requirement of the second data throughput rate.

Optionally, in any of the preceding aspects, the first data throughput rate is an amount of data per unit of time that can be processed by the UE for integrity protection.

Optionally, in any of the preceding aspects, the first data throughput rate is a number of transport layer bits per unit of time on integrity-protected channels.

Optionally, in any of the preceding aspects, the capability of the UE is the maximum capability or a threshold capability that the UE can support for processing the integrity-protected data.

Optionally, in any of the preceding aspects, the information comprising the capability for processing the integrity-protected data is received when the UE attaches to a wireless network.

Optionally, in any of the preceding aspects, the information comprising the capability is received from an access and mobility management function (AMF), another gNB, or the UE.

Optionally, in any of the preceding aspects, the request for establishing the first integrity-protected data radio bearer with the UE is received from an access and mobility management function (AMF).

Optionally, in any of the preceding aspects, whether the UE satisfies the requirement of the second data throughput rate is determined by determining whether the requirement of the second data throughput rate can be satisfied based on the first data throughput rate and the second data throughput rate.

Optionally, in any of the preceding aspects, when the first data throughput rate is greater than or equal to the second data throughput rate, the UE satisfies the requirement of the second data throughput rate.

Optionally, in any of the preceding aspects, whether the UE satisfies the requirement of the second data throughput rate is determined by determining whether the requirement of the second data throughput rate can be satisfied based on the capability of the UE, the second data throughput rate, and a third throughput rate associated with at least one second integrity-protected data radio bearer, the second integrity-protected data radio bearer having been established with the UE.

Optionally, in any of the preceding aspects, when the first data throughput rate is greater than or equal to a sum of the second data throughput rate and the third throughput rate, the UE satisfies the requirement of the second data throughput rate.

Optionally, in any of the preceding aspects, wherein the one or more processors execute the instructions to further receive an indication that the capability of the UE is split among a plurality of media access control (MAC) entities, wherein whether the requirement of the second data throughput rate can be satisfied is determined based on a fraction of the capability of the UE.

Optionally, in any of the preceding aspects, the capability of the UE is evenly split among the plurality of MAC entities.

Optionally, in any of the preceding aspects, the capability of the UE is split among the plurality of MAC entities in proportion to data throughput rates associated with integrity-protected radio bearers supported by the plurality of MAC entities.

According to yet another aspect of the present disclosure, there is provided an apparatus that includes a non-transitory memory storage comprising instructions; and one or more processors in communication with the memory storage, wherein the one or more processors execute the instructions to: send information comprising capability of a user equipment (UE) for processing integrity-protected data, the capability comprising a first data throughput rate; receive a request to establish a first integrity-protected data radio bearer associated with a requirement of a second data throughput rate when the requirement of the second data throughput rate can be satisfied by the UE, the requirement of the second data throughput rate being required for processing data communicated on the first integrity-protected data radio bearer, wherein the capability of the UE is used to evaluate whether the requirement of the second data throughput rate can be satisfied by the UE; and establish, in response to the request, the first integrity-protected data radio bearer.

Optionally, in any of the preceding aspects, the first data throughput rate is an amount of data per unit of time that is to be processed for integrity protection.

Optionally, in any of the preceding aspects, the first data throughput rate is a number of transport layer bits per unit of time on integrity-protected channels.

Optionally, in any of the preceding aspects, the capability of the UE is the maximum capability or a threshold capability that the UE can support for processing the integrity-protected data.

Optionally, in any of the preceding aspects, the information comprising the capability is sent when the UE attaches to a wireless network.

Optionally, in any of the preceding aspects, when the first data throughput rate is greater than or equal to the second data throughput rate, the UE satisfies the requirement of the second data throughput rate.

Optionally, in any of the preceding aspects, whether the requirement of the second data throughput rate can be satisfied by the UE is determined based on the capability of the UE, the second data throughput rate, and a third throughput rate associated with at least a second integrity-protected data radio bearer, the second integrity-protected data radio bearer having been established with the UE.

Optionally, in any of the preceding aspects, whether the requirement of the second data throughput rate can be satisfied by the UE is determined based on a fraction of the capability of the UE.

Figure 8:
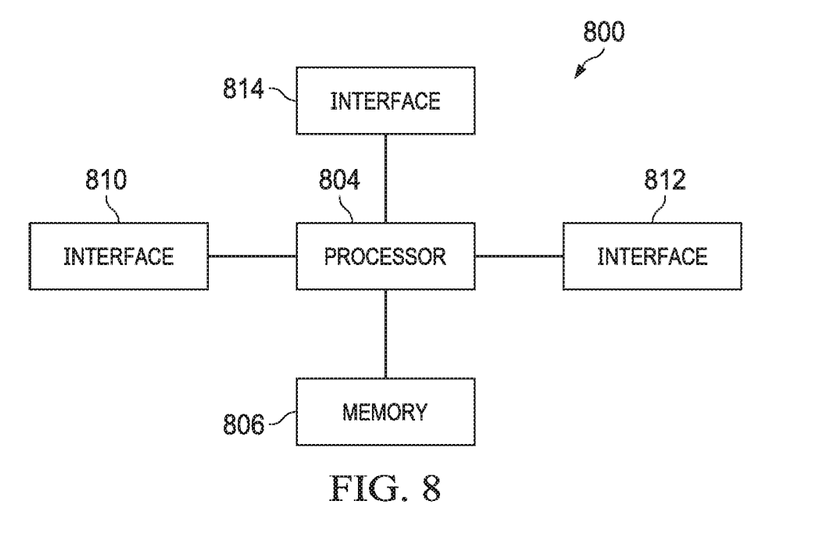
FIG. 8 illustrates a diagram of an embodiment processing system.

FIG. 8 illustrates a block diagram of an embodiment processing system 800 for performing methods described herein, which may be installed in a host device. As shown, the processing system 800 includes a processor 804, a memory 806, and interfaces 810-814, which may (or may not) be arranged as shown in FIG. 8. The processor 804 may be any component or collection of components adapted to perform computations and/or other processing related tasks, and the memory 806 may be any component or collection of components adapted to store programming and/or instructions for execution by the processor 804. In an embodiment, the memory 806 includes a non-transitory computer readable medium. The interfaces 810, 812, 814 may be any component or collection of components that allow the processing system 800 to communicate with other devices/components and/or a user. For example, one or more of the interfaces 810, 812, 814 may be adapted to communicate data, control, or management messages from the processor 804 to applications installed on the host device and/or a remote device. As another example, one or more of the interfaces 810, 812, 814 may be adapted to allow a user or user device (e.g., personal computer (PC), etc.) to interact/communicate with the processing system 800. The processing system 800 may include additional components not depicted in FIG. 8, such as long term storage (e.g., non-volatile memory, etc.).

In some embodiments, the processing system 800 is included in a network device that is accessing, or part otherwise of, a telecommunications network. In one example, the processing system 800 is in a network-side device in a wireless or wireline telecommunications network, such as a base station, a relay station, a scheduler, a controller, a gateway, a router, an applications server, or any other device in the telecommunications network. In other embodiments, the processing system 800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 9:
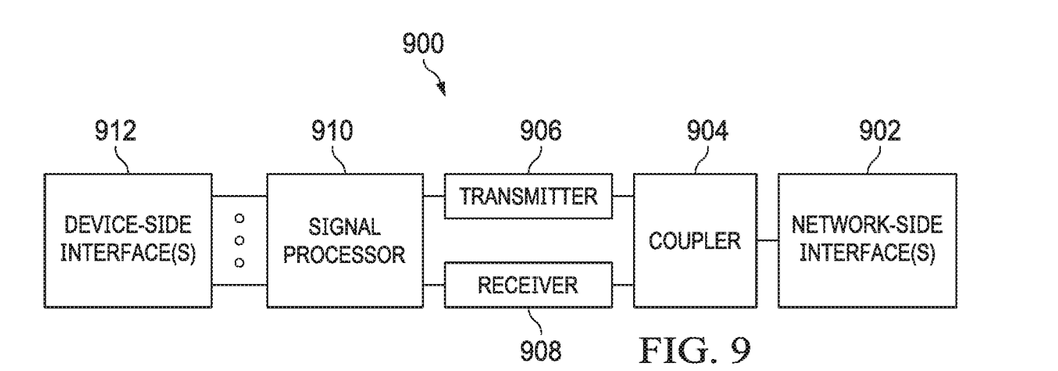
FIG. 9 illustrates a diagram of an embodiment transceiver.

In some embodiments, one or more of the interfaces 810, 812, 814 connects the processing system 800 to a transceiver adapted to transmit and receive signaling over the telecommunications network. FIG. 9 illustrates a block diagram of a transceiver 900 adapted to transmit and receive signaling over a telecommunications network. The transceiver 900 may be installed in a host device. As shown, the transceiver 900 comprises a network-side interface 902, a coupler 904, a transmitter 906, a receiver 908, a signal processor 910, and a device-side interface 912. The network-side interface 902 may include any component or collection of components adapted to transmit or receive signaling over a wireless or wireline telecommunications network. The coupler 904 may include any component or collection of components adapted to facilitate bi-directional communication over the network-side interface 902. The transmitter 906 may include any component or collection of components (e.g., up-converter, power amplifier, etc.) adapted to convert a baseband signal into a modulated carrier signal suitable for transmission over the network-side interface 902. The receiver 908 may include any component or collection of components (e.g., down-converter, low noise amplifier, etc.) adapted to convert a carrier signal received over the network-side interface 902 into a baseband signal. The signal processor 910 may include any component or collection of components adapted to convert a baseband signal into a data signal suitable for communication over the device-side interface(s) 912, or vice-versa. The device-side interface(s) 912 may include any component or collection of components adapted to communicate data-signals between the signal processor 910 and components within the host device (e.g., the processing system 800, local area network (LAN) ports, etc.).

The transceiver 900 may transmit and receive signaling over any type of communications medium. In some embodiments, the transceiver 900 transmits and receives signaling over a wireless medium. For example, the transceiver 900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 902 comprises one or more antenna/radiating elements. For example, the network-side interface 902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an establishing unit/module, a determining unit/module, an evaluating unit/module, a storing unit/module, a requesting unit/module, and/or a multiplexing unit/module.

The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:
   receiving, by a gNodeB (gNB), information comprising capability of a user equipment (UE) for processing integrity-protected data for integrity protection, the capability comprising a first data throughput rate that indicates a rate at which the integrity-protected data can be processed for integrity protection;
   receiving, by the gNB, a request for establishing a first data radio bearer with the UE, the first data radio bearer being established for communicating data that has integrity protection, and the first data radio bearer associated with a requirement of a second data throughput rate that is required for processing the data communicated on the first data radio bearer; and
   determining, by the gNB, that the UE satisfies the requirement of the second data throughput rate based on the capability of the UE and, based thereon, establishing, by the gNB, the first data radio bearer with the UE.

2. The method of claim 1, wherein the first data throughput rate is an amount of data per unit of time that can be processed by the UE for integrity protection.

3. The method of claim 1, wherein the capability of the UE is a maximum capability that the UE can support for processing the integrity-protected data.

4. The method of claim 1, wherein receiving the information comprising the capability comprises receiving the information comprising the capability for processing the integrity-protected data when the UE attaches to a wireless network.

5. The method of claim 1, wherein the information comprising the capability is received from an access and mobility management function (AMF), another gNB, or the UE.

6. The method of claim 1, wherein determining, by the gNB, whether the UE satisfies the requirement of the second data throughput rate comprises:
   determining whether the requirement of the second data throughput rate can be satisfied based on the first data throughput rate and the second data throughput rate.

7. The method of claim 6, wherein when the first data throughput rate is greater than or equal to the second data throughput rate, the UE satisfies the requirement of the second data throughput rate.

8. The method of claim 1, wherein determining, by the gNB, whether the UE satisfies the requirement of the second data throughput rate comprises:
   determining whether the requirement of the second data throughput rate can be satisfied based on the capability of the UE, the second data throughput rate, and a third throughput rate associated with at least one second data radio bearer, the second data radio bearer having been established with the UE and configured to communicate integrity-protected data.

9. The method of claim 8, wherein when the first data throughput rate is greater than or equal to a sum of the second data throughput rate and the third throughput rate, the UE satisfies the requirement of the second data throughput rate.

10. A method comprising:
    sending, by a user equipment (UE), information comprising capability of the UE for processing integrity-protected data for integrity protection, the capability comprising a first data throughput rate;
    receiving, by the UE, a message for the UE to establish a first data radio bearer, the first data radio bearer being established for communicating data that has integrity protection, and the first data radio bearer being associated with a requirement of a second data throughput rate that is required for processing the data that has integrity protection, the requirement of the second data throughput rate being satisfied by the UE, and the capability of the UE configured to be used to determine whether the requirement of the second data throughput rate is capable of being satisfied by the UE; and
    establishing, by the UE in response to the received message, the first data radio bearer and communicating the data that has integrity protection over the first data radio bearer.

11. The method of claim 10, wherein the first data throughput rate is an amount of data per unit of time that is to be processed for integrity protection.

12. The method of claim 10, wherein the capability of the UE is a maximum capability that the UE can support for processing the integrity-protected data.

13. The method of claim 10, wherein the information comprising the capability is sent when the UE attaches to a wireless network.

14. The method of claim 10, wherein when the first data throughput rate is greater than or equal to the second data throughput rate, the UE satisfies the requirement of the second data throughput rate.

15. The method of claim 10, wherein whether the requirement of the second data throughput rate is satisfied by the UE is determined based on the capability of the UE, the second data throughput rate, and a third throughput rate associated with at least a second integrity-protected data radio bearer, the second integrity-protected data radio bearer having been established with the UE.

16. The method of claim 10, wherein processing the integrity-protected data comprises computing an integrity value for the integrity-protected data.

17. A method comprising:
    receiving, by a gNodeB (gNB), capability information indicating a data throughput rate in which a user equipment (UE) is capable of processing data for integrity protection;
    determining, by the gNB, that a data throughput rate in which the UE is capable of processing integrity-protected data is greater than or equal to a required data throughput rate of a radio bearer for communicating integrity-protected data between the gNB and the UE; and based thereon establishing, by the gNB, the radio bearer between the gNB and the UE.

18. The method of claim 17, further comprising:
receiving, by the gNB, a request to establish the radio bearer for communicating integrity-protected data between the gNB and the UE, the request indicating the required data throughput rate for communicating the integrity-protected data over the radio bearer.

19. The method of claim 17, wherein the data throughput rate indicated by the capability information is a maximum rate in which the UE is capable of processing data for integrity protection.

20. A gNodeB (gNB) comprising:
a processor; and
a non-transitory computer readable storage medium storing programming for execution by the processor, the programming including instructions to:
receiving, by a gNodeB (gNB), capability information indicating a data throughput rate in which a user equipment (UE) is capable of processing data for integrity protection;
  determining, by the gNB, that a data throughput rate in which the UE is capable of processing integrity-protected data is greater than or equal to a required data throughput rate of a radio bearer for communicating integrity-protected data between the gNB and the UE; and based thereon
  establishing, by the gNB, the radio bearer between the gNB and the UE.

21. The gNB of claim 20, wherein the programming further includes instructions to:
  receive a request to establish the radio bearer for communicating integrity-protected data between the gNB and the UE, the request indicating the required data throughput rate for communicating the integrity-protected data over the radio bearer.

22. The gNB of claim 20, wherein the data throughput rate indicated by the capability information is a maximum rate in which the UE is capable of processing data for integrity protection.

23. A method comprising:
  transmitting, by a user equipment (UE), capability information to a gNodeB (gNB), the capability information indicating a data throughput rate in which the UE is capable of processing data for integrity protection; and
  establishing, by the UE, a radio bearer between the gNB and the UE after transmitting the capability information to the gNB, wherein the data throughput rate in which the UE is capable of processing integrity-protected data is greater than or equal to a required data throughput rate of the radio bearer for communicating integrity-protected data between the gNB and the UE.

24. The method of claim 23, further comprising:
  transmitting, by the UE, a request to establish the radio bearer for communicating the integrity-protected data between the gNB and the UE prior to establishment of the radio bearer, the request indicating the required data throughput rate for communicating the integrity-protected data over the radio bearer.

25. The method of claim 23, wherein the data throughput rate indicated by the capability information is a maximum rate in which the UE is capable of processing data for integrity protection.

26. A user equipment (UE) comprising:
a processor; and
a non-transitory computer readable storage medium storing programming for execution by the processor, the programming including instructions to:
  transmit capability information to a gNodeB (gNB), the capability information indicating a data throughput rate in which the UE is capable of processing data for integrity protection; and
  establish a radio bearer between the gNB and the UE after transmitting the capability information to the gNB, wherein the data throughput rate in which the UE is capable of processing integrity-protected data is greater than or equal to a required data throughput rate of the radio bearer for communicating integrity-protected data between the gNB and the UE.

27. The UE of claim 26, wherein the programming further includes instructions to:
  transmit a request to establish the radio bearer for communicating the integrity-protected data between the gNB and the UE prior to establishment of the radio bearer, the request indicating the required data throughput rate for communicating the integrity-protected data over the radio bearer.

28. The UE of claim 26, wherein the data throughput rate indicated by the capability information is a maximum rate in which the UE is capable of processing data for integrity protection.

* * * * *